US009697421B2

(12) United States Patent
Mitoma et al.

(10) Patent No.: US 9,697,421 B2
(45) Date of Patent: Jul. 4, 2017

(54) STEREOSCOPIC CAMERA APPARATUS (71) Applicant: Hitachi Automotive Systems, Ltd., Hitachinaka-shi, Ibaraki (JP)

(72) Inventors: Hiroto Mitoma, Hitachinaka (JP); Ryo Ota, Hitachinaka (JP); Yuji Otsuka, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 14/770,670

(22) PCT Filed: Jan. 29, 2014

(86) PCT No.: PCT/JP2014/051877
§ 371 (c)(1),
(2) Date: Aug. 26, 2015

(87) PCT Pub. No.: WO2014/132729
PCT Pub. Date: Sep. 4, 2014

(65) Prior Publication Data
US 2016/0012283 A1 Jan. 14, 2016

(30) Foreign Application Priority Data
Mar. 1, 2013 (JP) .................................. 2013-040815

(51) Int. Cl.
*G06K 9/00* (2006.01)
*B60R 1/00* (2006.01)
(Continued)

(52) U.S. Cl.
CPC ............ *G06K 9/00369* (2013.01); *B60R 1/00* (2013.01); *B60R 11/04* (2013.01);
(Continued)

(58) Field of Classification Search
None
See application file for complete search history.

(56) References Cited

U.S. PATENT DOCUMENTS

| 5,410,346 A | 4/1995 | Saneyoshi et al. |
| 6,337,637 B1 | 1/2002 | Kubota et al. |

(Continued)

FOREIGN PATENT DOCUMENTS

| EP | 1 095 832 A1 | 5/2001 |
| JP | 5-265547 A | 10/1993 |

(Continued)

OTHER PUBLICATIONS

International Search Report dated Apr. 28, 2014 with English translation (Two (2) pages).

(Continued)

*Primary Examiner* — Delomia L Gilliard
(74) *Attorney, Agent, or Firm* — Crowell & Moring LLP (57) ABSTRACT In order to provide a stereoscopic camera apparatus capable of rapidly and accurately detecting a three-dimensional object even when the three-dimensional object abruptly appears in an angle of view, a stereoscopic camera apparatus 100 includes: three-dimensional object detecting means 105, 106, 107; to-be-covered object detecting means 108 for detecting a to-be-covered object having a known shape; and to-be-covered object covering-detecting means 109 and 110 for detecting whether or not the three-dimensional object detected by the three-dimensional object detecting means covers the to-be-covered object when the to-be-covered object is detected by the to-be-covered object detecting means 108. When it is detected that the three-dimensional object covers the to-be-covered object, the to-be-covered object covering-detecting means 109 and 110 detect the three-dimensional object which covers the to-be-covered object by performing a process for determining whether or not the three-dimensional object is present in a simpler way, as compared to a case where the to-be-covered object (Continued)

covering-detecting means 109 and 110 detect that the three-dimensional object does not cover the to-be-covered object.

8 Claims, 10 Drawing Sheets

(51) Int. Cl.
  *B60R 11/04* (2006.01)
  *G06T 7/593* (2017.01)

(52) U.S. Cl.
  CPC .......... *G06K 9/00805* (2013.01); *G06T 7/593* (2017.01); *B60R 2300/107* (2013.01); *B60R 2300/8093* (2013.01); *G06T 2207/30261* (2013.01)

(56) References Cited

U.S. PATENT DOCUMENTS

2011/0184617 A1  7/2011  Hegemann et al.

2015/0302586 A1* 10/2015  Fukata ............... G06K 9/00791
                                                              382/103

FOREIGN PATENT DOCUMENTS

| JP | 6-266828 A | | 9/1994 |
|----|------------|---|--------|
| JP | 06266828 A | * | 9/1994 |
| JP | 2001-351200 A | | 12/2001 |
| JP | 2007-232593 A | | 9/2007 |
| JP | 2007232593 A | * | 9/2007 |
| JP | 2008-242571 A | | 10/2008 |
| JP | 2008242571 A | * | 10/2008 |
| JP | 2011-525005 A | | 9/2011 |

OTHER PUBLICATIONS

Extended European Search Report issued in counterpart European Application No. 14757654.0 dated Sep. 29, 2016 (9 pages).

* cited by examiner

STEREOSCOPIC CAMERA APPARATUS

TECHNICAL FIELD

The present invention relates to a stereoscopic camera apparatus which detects a target using images captured from plural image sensors.

BACKGROUND ART

As a method of detecting a target using images captured from plural image sensors, a method of calculating a distance of each pixel of an image in a real space using a pair of images according to the principle of triangulation so as to detect a three-dimensional object is known in the related art (PTL 1). In this method, groups of pixels whose positions on the images are close to each other and whose calculated distances in a real space are also close to each other are detected, and a group of pixels having a predetermined size or more is detected as a three-dimensional object. As a result, a three-dimensional object can be detected with high accuracy.

In addition, as another method of accurately detecting a target using images captured from plural image sensors, a method of detecting an object moving at a given speed on a pedestrian crossing and identifying the object with high accuracy as a pedestrian is known in the related art (PTL 2). In this method, a pedestrian moving on a pedestrian crossing is detected with high reliability by increasing the detection sensibility thereof such that collision with the pedestrian. is avoided. As a result, a collision accident with a pedestrian on a pedestrian crossing where an accident is likely to occur can be prevented.

CITATION LIST

Patent Literature

PTL 1: JP-A-5-265547
PTL 2: JP-T-2011-525005

SUMMARY OF INVENTION

Technical Problem

However, in the techniques disclosed in PTLS 1 and 2, for example, in a case where a pedestrian is detected using a vehicle-mounted stereoscopic camera apparatus to avoid collision with the pedestrian, there is a problem in that, when a vehicle turns right or left such that a pedestrian abruptly appears in an angle of view, the pedestrian cannot be rapidly identified as a target.

That is, PTL 1 discloses a technique of detecting a group of positions close to each other by a distance shorter than the distance of each pixel as a three-dimensional object. However, in practice, during the detection of a three-dimensional object, only when a candidate for the three-dimensional object is continuously or intermittently detected in a region near a real space a predetermined number of times within a predetermined amount of time, this candidate can be identified as a control target. This method is to prevent the erroneous detection of a three-dimensional object and to prevent erroneous braking or the like based on the erroneously detected three-dimensional object even when a wrong distance is calculated due to mismatching during the calculation of the distance of each pixel. This method is generally used. In this way, in the method disclosed in PTL 1, a relatively long period of time is required to detect a three-dimensional object. Therefore, for example, when a vehicle turns right or left such that a pedestrian abruptly appears in an angle of view, this pedestrian cannot be rapidly identified as a control target.

In addition, PTL 2 discloses a technique of detecting a pedestrian crossing so as to detect a three-dimensional object moving at a given speed or higher on the pedestrian crossing as a pedestrian with high reliability. However, as in the technique disclosed in PTL 1, it is considered that, in order to prevent the erroneous detection of a three-dimensional object, a given period of time is required until a three-dimensional object is identified as a control target after the detection thereof. In addition, when means for detecting a three-dimensional object is an image sensor, a relative speed cannot be directly calculated. Therefore, a given period of time is also required to determine whether or not the three-dimensional object moves at a given speed or higher. Further, even when a three-dimensional object is detected using a millimeter-wave radar capable of directly calculating a relative speed, a moving speed in a horizontal direction cannot be directly calculated. Therefore, a long period of time is required for the determination of a control target.

Accordingly, in the techniques disclosed in PTLs 1 and 2, when a vehicle turns right or left such that a pedestrian abruptly appears in an angle of view, a warning to a driver may be delayed, or the operation of automatic braking may be delayed.

The present invention has been made in consideration of the above-described circumstances, and an object thereof is to provide a stereoscopic camera apparatus capable of rapidly and precisely detecting a three-dimensional object even when the three-dimensional object abruptly appears in an angle of view.

Solution to Problem

In order to solve the problem, the present invention provides a stereoscopic camera apparatus including: three-dimensional object detecting means for calculating at least a distance to a three-dimensional object in a real space, a horizontal position, and a width by stereoscopy based on images captured from first and second image sensors; to-be-covered object detecting means for detecting a to-be-covered object having a known shape based an image captured from one of the first and second image sensors; and to-be-covered object covering-detecting means for detecting whether or not the three-dimensional object detected by the three-dimensional object detecting means covers the to-be-covered object when the to-be-covered object is detected by the to-be-covered object detecting means, in which when it is detected that the three-dimensional object covers the to-be-covered object, the to-be-covered object covering-detecting means detects the three-dimensional object which covers the to-be-covered object by performing a process for determining whether or not the three-dimensional object is present in a simpler way, as compared to a case where it is detected that the three-dimensional object does not cover the to-be-covered object.

Advantageous Effects of Invention

According to the present invention, not only the detection of a three-dimensional object using stereoscopy but also the determination of whether or not a three-dimensional object covers a to-be-covered object having a known shape are performed. When it is detected that the three-dimensional object covers the to-be-covered object, a process using the to-be-covered object covering-detecting means for determining whether or not the three-dimensional object is present is performed in a simpler way. Therefore, the presence of the three-dimensional object at a position of the to-be-covered object can be determined within a short period of time. Accordingly, when a vehicle turns right, or left such that a pedestrian abruptly appears in an angle of view, a warning to a driver or the operation of automatic braking can be accurately performed.

DESCRIPTION OF EMBODIMENTS

Hereinafter, each example of an embodiment of a stereoscopic camera apparatus according to the present invention will be described with reference to the drawings. In the following description, a stereoscopic camera apparatus including two cameras will be described as an example, but the scope of the present, invention is not limited thereto. For example, the present invention can be applied to a stereoscopic camera apparatus including three or more cameras.

Example 1

Figure 1:
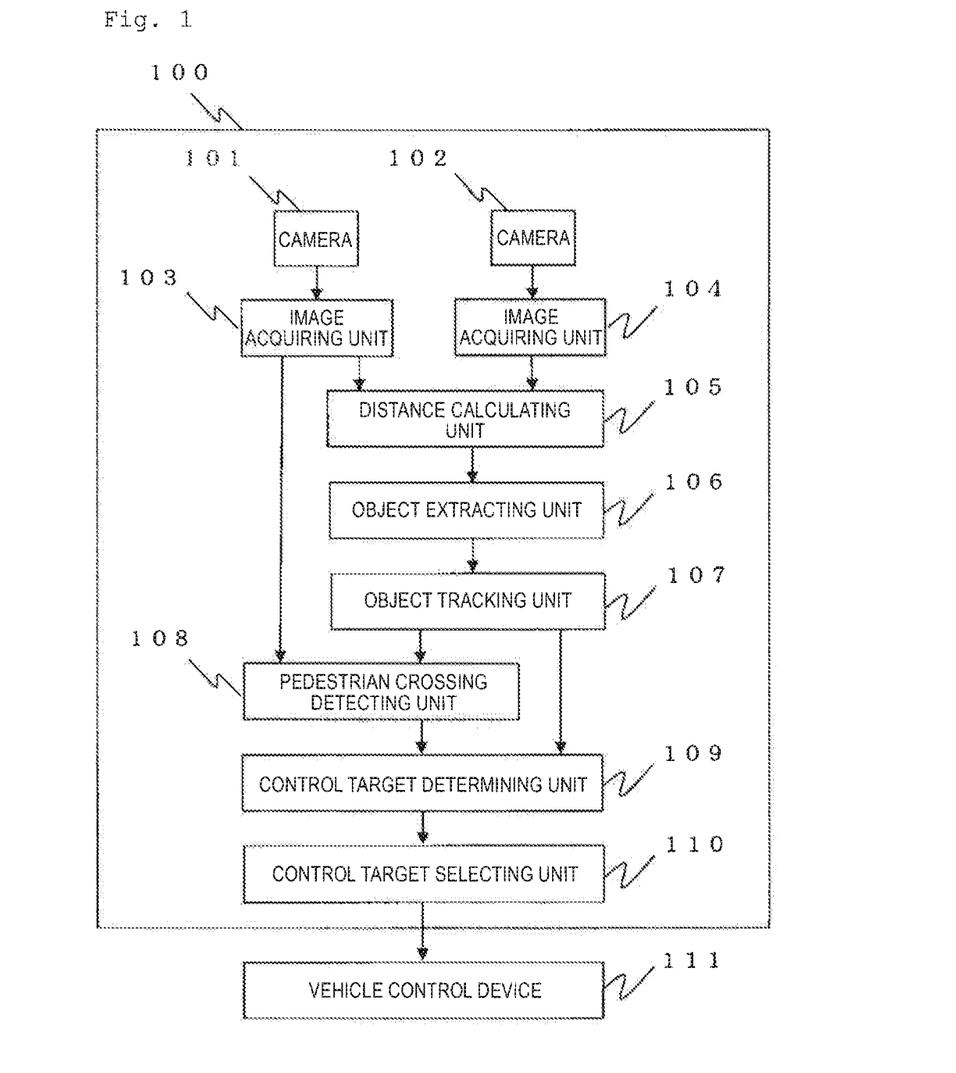
FIG. 1 is a block diagram showing a stereoscopic camera apparatus according to Example 1.

FIG. 1 shows the overall configuration of a stereoscopic camera apparatus 100 according to Example 1. The stereoscopic camera apparatus 100 according to Example 1 detects a pedestrian as a three-dimensional object, detects a pedestrian crossing as a to-be-covered object, determines and selects a control target. That is, as clearly seen from FIG. 1, the stereoscopic camera apparatus 100 according to Example 1 includes two imaging units of a camera 101 and a camera 102 and acquires images captured from the camera 101 and the camera 102 through an image acquiring unit 103 and an image acquiring unit 104. In the distance calculating unit 105, a distance in a real space is calculated for each preset fixed block size using the images acquired by the image acquiring unit 103 and the image acquiring unit 104, respectively. In a three-dimensional object extracting unit 106, the pedestrian as the three-dimensional object is extracted using the distance obtained by the distance calculating unit 105. In a three-dimensional object tracking unit 107, three-dimensional object information obtained by the three-dimensional object extracting unit 106 is tracked in a chronological order, a relative speed is calculated, and the results of filtering various parameters of the three-dimensional object are output. In a pedestrian crossing detecting unit 108, using the filtered three-dimensional object information obtained by the three-dimensional object extracting unit 107 and the image obtained by the image acquiring unit 104, the pedestrian crossing near the three-dimensional object is detected, and whether or not the pedestrian as the three-dimensional object covers the pedestrian crossing as the to-be-covered object is determined. In a control target determining unit 109, using the information regarding whether or not the pedestrian crossing is present near the three-dimensional object obtained by the pedestrian crossing detecting unit 108, whether or not a tracked three-dimensional object obtained by the three-dimensional object tracking unit 107 is a candidate for a control target is determined. In a control target selecting unit 110 a control target is selected among control target candidates obtained by the control target determining unit 109, and information of the control target as a selected target is transmitted to a vehicle control device 111.

Hereinafter, the configuration of each unit shown in FIG. 1 will be described in detail.

The camera 101 and the camera 102 are installed near a rear-view mirror installed inside a vehicle so as to be distant from each other in a horizontal direction by a given distance, to be positioned at the same height position, and to face the front of the vehicle. These cameras 101 and 102 include an image sensor such as COD or CMOS and are synchronized with each other and adjusted so as to be sampled at the same timing.

The image acquiring unit 103 acquires the image captured from the camera 101 and converts a luminance value to a digital value such that image processing can be performed in the subsequent processing unit. The image acquiring unit 104 acquires the image captured from the camera 102 and converts a luminance value to digital data such that image processing can be performed in the subsequent processing unit. In addition, the image acquiring unit 103 and the image acquiring unit 104 correct the image captured from the camera 101 and the image captured from the camera 102 so as to remove differences in imaging environment and imaging characteristics between the two cameras, and transmit the image data to the subsequent process.

Figure 2:
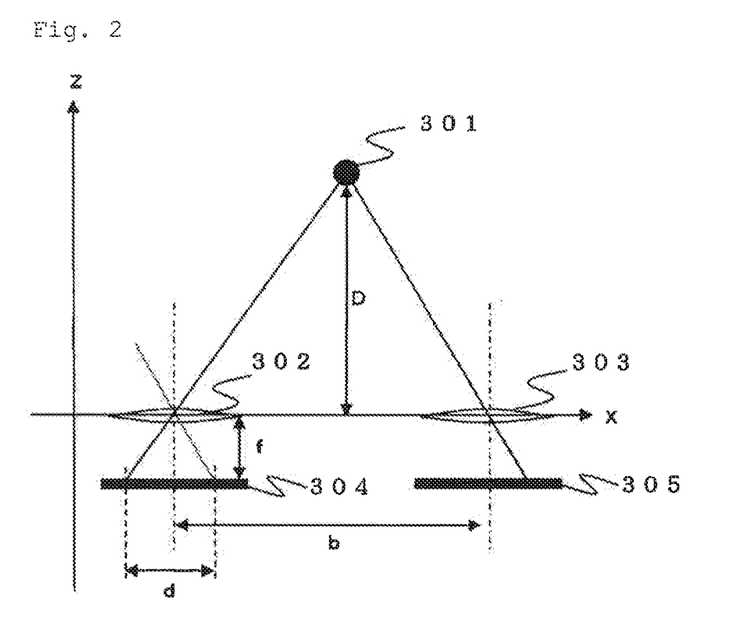
FIG. 2 is a diagram showing a principle of measuring a distance in the stereoscopic camera apparatus.

The distance calculating unit 105 divides the image acquired by the image acquiring unit 104 into blocks having a preset fixed block size (for example, 4×4 [pix]) and calculates a distance in a real space for each divided block. FIG. 2 shows a general principle of measuring a distance using the stereoscopic camera apparatus. In the drawing, reference numeral D represents a distance from an installation position of a lens 302 and a lens 303 to a measurement point 301; reference numeral f represents a distance (focal length of the lens 302) between the lens 302 and an imaging plane 304 and a distance (focal length of the lens 303) between the lens 303 and an imaging plane 305; reference numeral b represents a distance (base-line length) between center of the lens 302 and the center of the lens 303; and reference numeral d represents a difference (disparity) between a position where the measurement point 301 is imaged on the imaging plane 304 through the lens 302 and a position where the measurement point 301 is imaged on the imaging plane 305 through the lens 303. The following equation is established among the above symbols according to a relationship of triangle similarity.

$$D = b \times f / d \tag{1}$$

In the equation (1), the focal length f and the base-line length b are constants determined based on the configuration of the cameras. Therefore, in order to obtain the distance D, only the disparity d which is a difference in vision between the left and right lenses needs to be obtained. A method of obtaining this disparity d will be described using FIG. 3. In Example 1, the image captured from the camera 101 installed on the left side will be referred to as "left image", and the image captured from the camera 102 installed on the right side will be referred to as "right image". Further, the left image is set as "base image", and the right image is set as "reference image".

Figure 3:
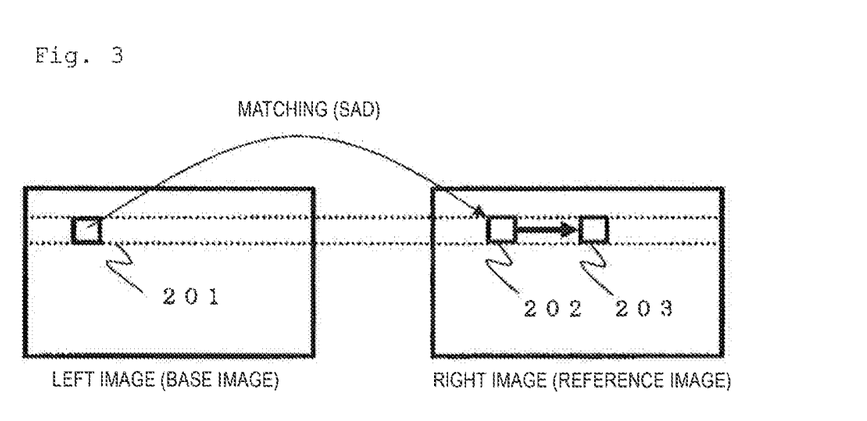
FIG. 3 is a diagram showing a distance calculating process which is performed by a distance calculating unit included in the stereoscopic camera apparatus according to Example 1.
Figure 4:
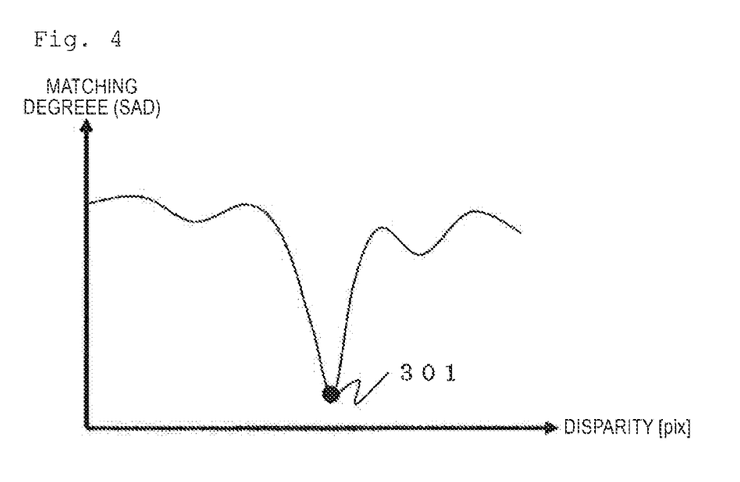
FIG. 4 is a matching decree graph of each pixel which is obtained by the distance calculating unit included in the stereoscopic camera apparatus according to Embodiment 1.

An image 201 which is obtained by dividing the base image into a fixed block size (for example, a size of 4×4 [pix]) is compared to an image 202 which has the same height and the same size as those of the image 201 on the reference image so as to calculate a matching degree between the images. The matching degree between the images can be calculated using, for example, the sum of the absolute differences (SAD) between the luminances of the respective pixels. The calculation of the matching degree is repeated while shifting the pixels one by one in a range from the image 202 to the image 203, which is distant from the image 202 by a predetermined number of pixels, to search for a block having the highest matching degree. That is, when The calculation of the matching degree is repeated while shifting the pixels one by one in a range from the image 202 to The image 203, a graph shown in FIG. 4 is obtained, and the maximum value 301 is a disparity having the highest matching degree. As a result, since the disparity d can be obtained from the difference between the images, the distance D of each block in a real space can be calculated using the equation (1). The peak of the SAD results around the disparity having the highest matching degree is obtained using, for example, quadratic function approximation. As a result, the disparity can be calculated, instead of in units of pixels, in units of sub-pixels.

The three-dimensional object extracting unit 106 extracts the three-dimensional object based on a depth map which is calculated by obtaining a distance for each block of the entire region of the images using the distance calculating unit 105. First, distance histograms are created for each column of blocks, and when the number of distance histograms having a peak is a threshold value or more, it can be considered that a three-dimensional object candidate is present in the column. Next, in a column adjacent to the above column, a three-dimensional object candidate is present, and when a distance of a histogram having a peak is a threshold value or less, this column is grouped as the same three-dimensional object. Finally, when the width of the grouped three-dimensional object is a threshold value or more, there columns are registered as a three-dimensional object. After the group is registered as a three-dimensional object, blocks around the distances of the columns which form the same three-dimensional object are grouped on the depth map, and a distance to the three-dimensional object in a real space is calculated based on positions on the depth map (a lower end, an upper end, a left end, and a right end on the image) and the average of the grouped distances. Hereinafter, the three-dimensional object obtained as described above will be referred to as an extracted three-dimensional object having a position, a distance, and the like as parameters. The peak value of the histograms varies depending on the distance to the three-dimensional object. Therefore, in order to accurately extract various three-dimensional objects having different distances, the above-described threshold values are appropriately changed depending on the distances.

The three-dimensional object tracking unit 107 tracks the extracted three-dimension object obtained by the three-dimensional object extracting unit 106 in a chronological order, calculates a relative speed based on the change amount of distance, filters the parameters such as a distance and a relative speed, and outputs a tracked three-dimensional object having a position, a distance, and a relative speed, which are filtered, as parameters. Specifically, the following process is repeated. That is, when a tracked three-dimensional object of previous processing frame is present, this tracked three-dimensional object is compared to an extracted three-dimensional object detected in the present processing frame. When a difference of each parameter is a threshold value or less, it is determined that the tracked three-dimensional object matches the extracted three-dimensional object, and parameters of the tracked three-dimensional object of the previous processing frame are updated using parameters of the extracted three-dimensional object of the present processing frame. The details of an updating method will not described in detail, but can be realized, for example, by setting the extracted three-dimensional object as an observed value using a Kalman filter and obtaining an error variance from actually measured values. In addition, the extracted three-dimensional object which does not match any tracked three-dimensional object of the previous processing frame is newly registered as an initially detected tracked three-dimensional object.

Figure 5:
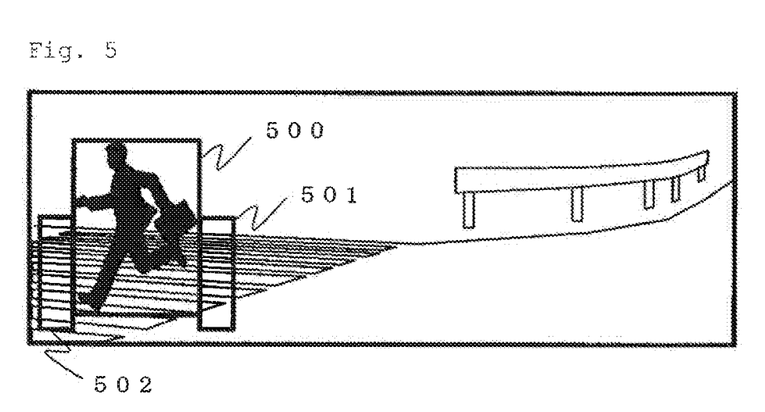
FIG. 5 is a diagram showing a method of setting pedestrian crossing detection frames which is performed by a pedestrian crossing detecting unit included in the stereoscopic camera apparatus according to Example 1.

The pedestrian crossing detecting unit 108 determines whether or not each tracked three-dimensional object covers the pedestrian crossing using the tracked three-dimensional object, which is obtained by the three-dimensional object tracking unit 107, and the image which is obtained by the image acquiring unit 103. First, as shown in FIG. 5, pedestrian crossing detection frames 501 and 502 for determining whether or not the pedestrian crossing is present are set on left and right sides of position information 500 which is obtained as a parameter of the tracked three-dimensional object. At this time, when an image is not present on left side or the right side of the three-dimensional object or when the sizes of pedestrian crossing detection frames to be set on the left side or the right side of the three-dimensional object are smaller than a preset threshold value, the pedestrian crossing detection frames are not set. As positions of setting the pedestrian crossing detection frames, upper ends thereof are positioned in the middle of the three-dimensional object, lower ends thereof are positioned below lower ends of the three-dimensional object, and the width thereof is experimentally determined.

Figure 6:
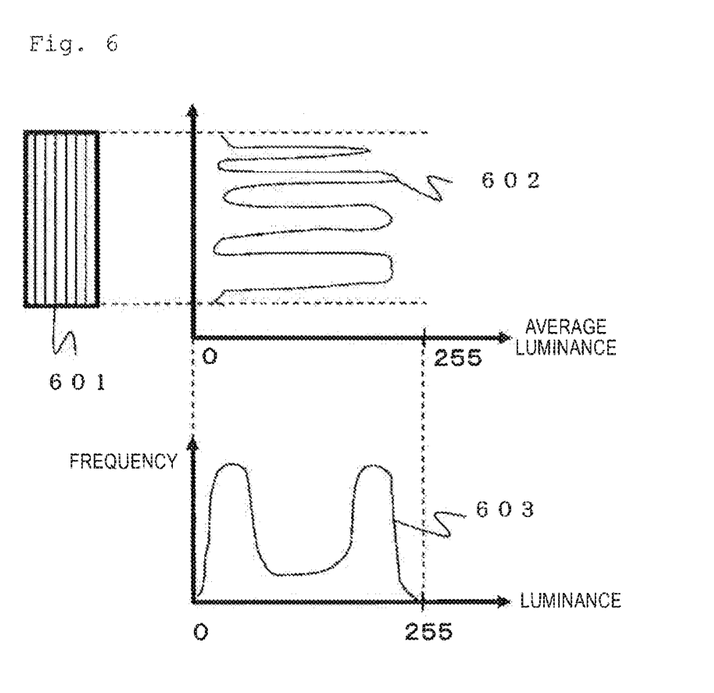
FIG. 6 is a diagram showing a method of detecting a pedestrian crossing which is performed by the pedestrian crossing detecting unit included in the stereoscopic camera apparatus according to Example 1 and showing a luminance projection graph and a luminance distribution graph which are obtained using the method.

Next, as shown in FIG. 6, the pedestrian crossing detection frames 501 and 502 is divided into strips 601 (for example, widths: 3 [pix]). Regarding the divided strips, an average luminance (for example, average of luminances of the widths 3 [pix]) is obtained for each row, and this process is performed in an amount corresponding to the height of the pedestrian crossing detection frames. Using this average, the noise of the image can be reduced. A luminance projection graph 602 obtained as described above is created for all the strips, and histograms of the values are created to create a luminance distribution graph 603. By obtaining a variance of a luminance peak distribution obtained at this time, whether or not the pedestrian crossing is present is determined based on the size of the variance. For example, in the case of the pedestrian crossing, contrast is concentrated on two portions including a bright portion and a dark portion, and thus the variance thereof increases. Conversely, in a region other than the pedestrian crossing, a distribution is shown in a portion other than a highly contrasting portion, and thus the variance thereof decreases. Using this characteristic, a threshold value for determining whether or not the pedestrian crossing is present is experimentally set and determined. At this time, when it is determined from one of the pedestrian crossing detection frames that the pedestrian crossing is present, it is determined that the three-dimensional object covers the pedestrian crossing. In this way, by performing the determination on a region near the tracked three-dimensional object, a process load can be suppressed as compared to a case where whether or not the pedestrian crossing is present is determined using the entire region of the images.

Figure 7:
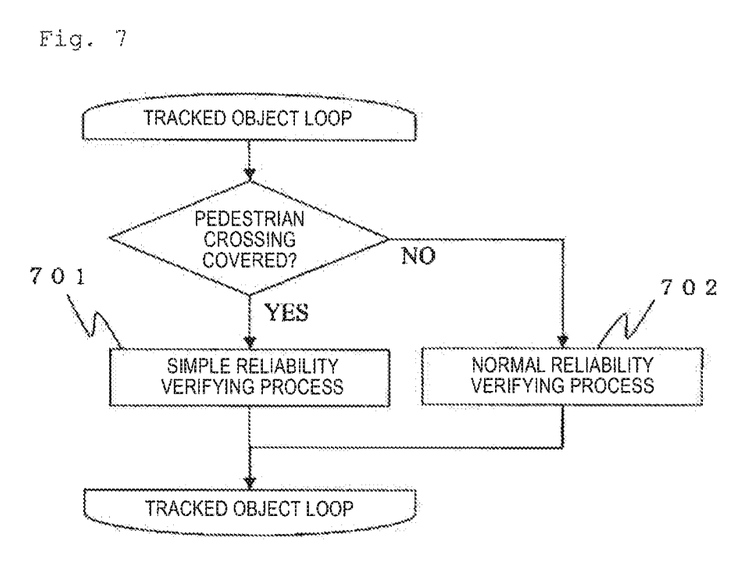
FIG. 7 is a flowchart showing the procedure of a control target determining unit included in stereoscopic camera apparatus according to Example 1.

The control target determining unit 109 determines a candidate for a control target using the tracked three-dimensional object obtained by the three-dimensional object tracking unit 107 and pedestrian crossing covering information for each tracked three-dimensional object obtained by the pedestrian crossing detecting unit 108. FIG. 7 shows a process flow. First, when the pedestrian crossing covering information obtained by the pedestrian crossing detecting unit 108 contains the content that the tracked three-dimensional object does not cover the pedestrian crossing, a normal reliability verifying process 702 is performed. In addition, when the pedestrian crossing covering information contains the content that the tracked three-dimensional object covers the pedestrian crossing, a simple reliability verifying process is performed.

In the normal reliability verifying process 702, whether or not the extracted three-dimensional object matches the tracked three-dimensional object through, for example, previous continuous 5 or more processing frames is verified such that only the tracked three-dimensional object satisfying a condition is registered as a control candidate three-dimensional object. As a result, the risk of unintentionally controlling a detected three-dimensional object based on the influence of a wrong distance, which is caused by artifacts due to noise or mismatching in the distance calculating unit 105, can be avoided. On the other hand, in the simple reliability verifying process 701, basically, the tracked three-dimensional object is registered as a control candidate three-dimensional object without verification. The reason is as follows. The information containing the content that the pedestrian crossing is covered and the circumstance that the three-dimensional object is detected accurately show the presence of the three-dimensional object. Therefore, the presence of the three-dimensional object can be accurately shown without a long period of verification. In the simple reliability verifying process 701, it is sufficient that the registration of the control candidate three-dimensional object is performed more rapidly as compared to the normal reliability verifying process 702, and the verifying process is not necessarily omitted. For example, when the accuracy of the pedestrian crossing covering information is low, the registration of the control candidate three-dimensional object can be performed under a condition where the pedestrian crossing covered state is continuously detected twice.

In the control target selecting unit 110, the most suitable control target is selected among the control candidate three-dimensional objects determined, by the control target determining unit 109. Specifically, a steering angle, a yaw rate, and a vehicle speed are acquired through a CAN. In addition, a white line is identified from the images obtained by image acquiring units. These pieces of information are combined to estimate a traveling line of a vehicle, and a control candidate three-dimensional object on the traveling inc which is positioned on the most front side is output as a control target.

The vehicle control device 111 determines whether or not the risk of collision is present based on control target. information such as a distance in a real space or a relative speed which is transmitted from the stereoscopic camera apparatus 100 through a CAN bus or the like. When the risk is present, the vehicle control device 111 emits an alarm to urge a driver to take a collision avoiding action. When the collision cannot be avoided in the end, automatic braking is operated to avoid the collision or to reduce the impact.

As described above, in the stereoscopic camera apparatus according to Example 1, whether or not the three-dimensional object covers the pedestrian crossing is also added as the information. When it is determined that the three-dimensional object covers the three-dimensional object, the registration of the control candidate three-dimensional object is performed through the simple reliability verifying process. Therefore, the registration of the control candidate three-dimensional object can be rapidly performed. When a vehicle turns right or left such that a three-dimensional object abruptly appears in an angle of view of the cameras, an accident can be prevented in advance. In addition, in the stereoscopic camera apparatus according to Example 1, the distance to a known shape can be calculated using stereoscopy, for example, even when a traffic sign image is different from a normal image due to contamination, scratching, or shadow. Therefore, whether or not the detection is performed due to the covering of the three-dimensional object or simply due to contamination, scratching, or shadow can be determined, and erroneous detection can be prevented. Further, in the stereoscopic camera apparatus according to Example 1, the three-dimensional object extracting process is performed before the pedestrian crossing detecting process. Therefore, the extraction of the three-dimensional object can be accurately performed.

Example 2

Figure 8:
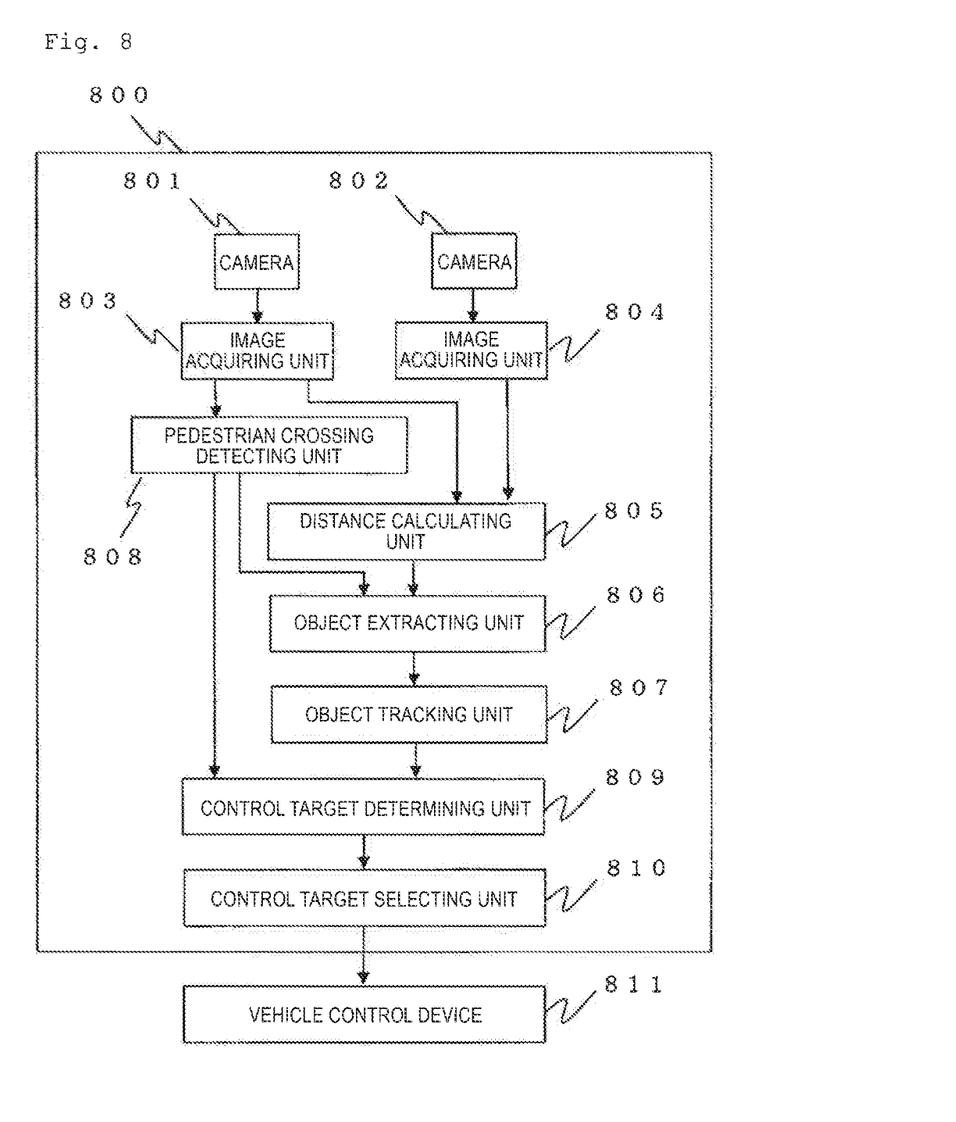
FIG. 8 is a block diagram showing a stereoscopic camera apparatus according to Example 2.

FIG. 8 shows the overall configuration of a stereoscopic camera apparatus 800 according to Example 2. The stereoscopic camera apparatus 800 includes two imaging units of a camera 801 and a camera 802 and acquires images captured from the camera 801 and the camera 802 through an image acquiring unit 803 and an image acquiring unit 804, respectively. In a pedestrian crossing detecting unit 808, a pedestrian crossing is detected based on The image acquired by the image acquiring unit 803. In a distance calculating unit 805, a distance in a real space is calculated for each preset fixed block size using the images acquired by the image acquiring unit 803 and the image acquiring unit 804. In a three-dimensional object extracting unit 806, the three-dimensional object is extracted using the distance obtained by the distance calculating unit 805. At this time, the extraction of the three-dimensional object is promoted by adding pedestrian crossing detection information obtained by a pedestrian crossing detecting unit 808. In a three-dimensional object tracking unit 807, three-dimensional object information obtained by the three-dimensional object extracting unit 806 is tracked in a chronological order, a relative speed is calculated, and the results of filtering various parameters of the three-dimensional object are output. In a control target determining unit 809, using the information regarding whether or not the pedestrian crossing is present near the three-dimensional object obtained by the pedestrian crossing detecting unit 808, whether or not a tracked three-dimensional object obtained by the three-dimensional object tracking unit 807 is a candidate for a control target is determined. In a control target selecting unit 810, a control target is selected among control target candidates obtained by the control target determining unit 809, and information of the selected control target is transmitted to a vehicle control device 811.

Hereinafter, the configuration of each unit shown in FIG. 8 will be described in detail.

The camera 801 and the camera 802 correspond to the camera 101 and the camera 102 of the stereoscopic camera apparatus 100 according to Example 1. The image acquiring unit 803 and the image acquiring unit 804 correspond to the image acquiring unit 103 and the image acquiring unit 104 of the stereoscopic camera apparatus 100 according to Example 1. The distance calculating unit 805 corresponds to the distance calculating unit 105 of the stereoscopic camera apparatus 100 according to Example 1. The three-dimensional object tracking unit 807 corresponds to the three-dimensional object tracking unit 107 of the stereoscopic camera apparatus 100 according to Example 1. The control target selecting unit 810 corresponds to the control target selecting unit 110 of the stereoscopic camera apparatus 100 according to Example 1. The vehicle control device 811 corresponds to the vehicle control device 111 of the stereoscopic camera apparatus 100 according to Example 1. Accordingly, the above units will not be described to avoid the repetition of the description.

Figure 9:
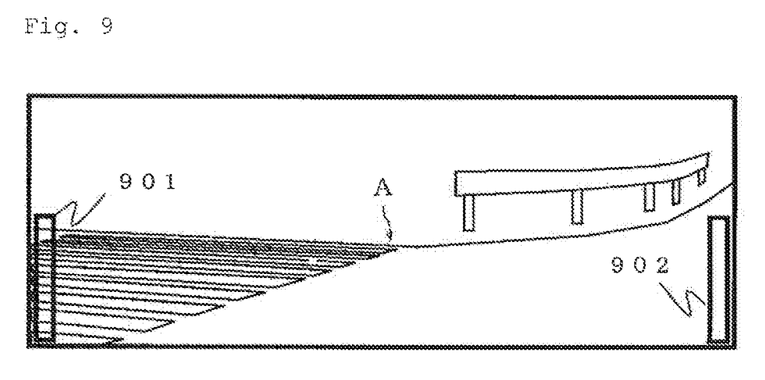
FIG. 9 is a diagram showing a method of setting pedestrian crossing detection frames which is performed by a pedestrian crossing detecting unit included in the stereoscopic camera apparatus according to Example 2.

The pedestrian crossing detecting unit 808 determines whether or not the pedestrian crossing is present in the image using the image obtained by the image acquiring unit 103. Specifically, first, as shown in FIG. 9, a left pedestrian crossing detection frame 901 and a right pedestrian crossing detection frame 902 are set on the image taken into the image acquiring unit 803. Regarding the installation positions of the pedestrian crossing detection frames 901 and 902, upper ends thereof are positioned substantially in the middle of the image, lower ends are positioned to match lower ends of the image, and left and right ends thereof are positioned to match left and right ends of the image, respectively. In addition, the width of the pedestrian crossing detection frames is set as, for example, 3 [pix]. The left pedestrian crossing detection frame 901 is used during a left turn, and the right pedestrian crossing detection frame 902 is used during a right turn.

Next, as in the case of Example 1, a luminance projection graph 602 is created by using each of the pedestrian crossing detection frames 901 and 902 as one of the strips shown in FIG. 6. As a result, a luminance distribution graph 603 is created. By obtaining a distribution of the luminance distribution graph 603, at this time, the pedestrian crossing likelihood can be obtained in the pedestrian crossing detection frames 901 and 902 of the image. When the pedestrian crossing likelihood is tracked in a chronological order, during a left turn, the pedestrian crossing starts to appear from the right side (A point side) thereof, and an occupancy ratio of the shape of the pedestrian crossing in the pedestrian crossing detection frames gradually increases. After the ratio reaches a peak, the ratio gradually decreases. This phenomenon is expressed by the variance of the luminance distribution graph 603. First, the variance is low, and when the image of the pedestrian crossing starts to appear in the pedestrian crossing detection frames, the variance gradually increases. After the variance reaches a peak, the variance gradually decreases. At this time, when the three-dimensional object is positioned on the pedestrian crossing, the three-dimensional object covers the shape of the pedestrian crossing, and thus the variance decreases. Using this characteristic, when the variance gradually increases to be a set threshold value or more, it is determined that a vehicle turns left (or right) on the pedestrian crossing. Next, when the variance rapidly decreases by a set threshold value or more, it is determined that the three-dimensional object may be appeared from a left end (during a right turn, a right end) of the image, and a left covering flag (during a right turn, a right covering flag) is set.

With this method, a pedestrian who starts to cross the pedestrian crossing cannot be accurately detected because the pedestrian covers a small area of the pedestrian crossing. However, in this state, the distance between the vehicle and the pedestrian is long. Therefore, it is determined that the risk is low, and it is considered that there is no problem.

A process using the three-dimensional object extracting unit 806 is substantially the same as the process using the three-dimensional object extracting unit 106 in Example 1. However, in order to detect the three-dimensional object in an early stage, when the left covering flag obtained by the pedestrian crossing detecting unit 808 (during a right turn, the right covering flag) is set and the grouped three-dimensional object is present near the pedestrian crossing detection frame on the left end of the image (during a right turn, the right end), the threshold value of the width (variable depending on the distance) is decreased to promote the extraction of the three-dimensional object.

Figure 10:
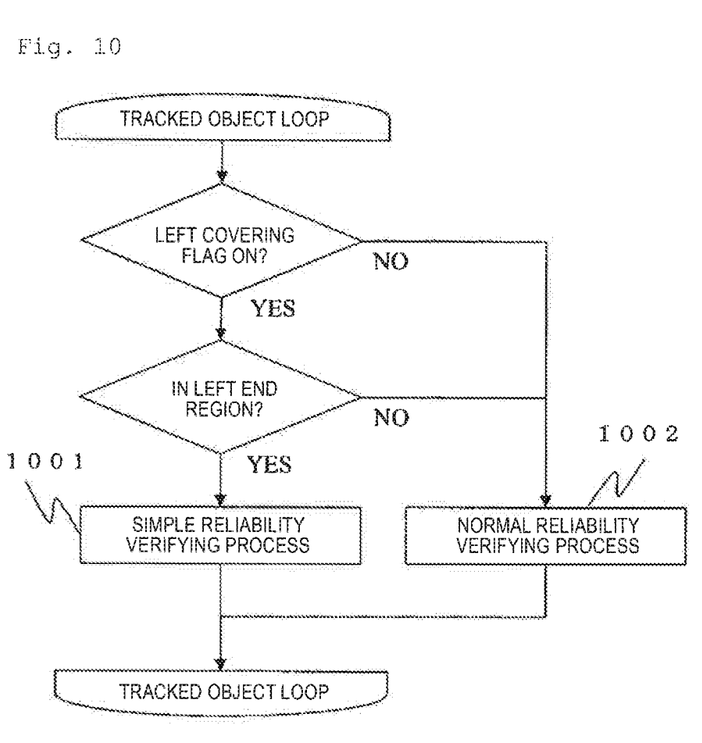
FIG. 10 is a flowchart showing the procedure of a control target determining unit included in the stereoscopic camera apparatus according to Example 2.

The control target determining unit 809 determines a candidate for a control target using the tracked three-dimensional object obtained by the three-dimensional object tracking unit 807 and the covering flags obtained by The pedestrian crossing detecting unit 808. FIG. 10 shows a process flow during a left turn (during a right turn, left is replaced with right). When the left covering flag is set on each tracked three-dimensional object, and when the tracked three-dimensional object is positioned in a left end region, a simple reliability verifying process 1001 is performed. Otherwise, a normal reliability verifying process 1002 is performed. Here, as in the case of the simple reliability verifying process 701 of Example 1, the simple reliability verifying process 1001 is performed by reducing verification conditions to be more gentle than that of the normal reliability verifying process 1002 or without verification. "In the left end region" described above refers to a region having a width in which the pedestrian appears from the left end of the image. This width is appropriately changed in consideration of the distance to the pedestrian. As a result, the safety against the abrupt appearance of the pedestrian can be improved.

In the stereoscopic camera apparatus according to Example 2, the pedestrian crossing detecting process is performed before the three-dimensional object extracting process. Therefore, the three-dimensional object extracting process can be performed using the result of the pedestrian crossing detecting process, and the three-dimensional object extracting process can be simplified. Accordingly, the process speed of the entire apparatus can be improved.

In Examples 1 and 2, the case where the pedestrian covers the pedestrian crossing when a vehicle turns right or left has been described as an example. However, in the stereoscopic camera apparatus according to the present invention, the detection can be promoted on a pedestrian crossing which appears on the front of a vehicle when the vehicle travels straight. In this case, for example, an image near the three-dimensional object is scanned in a horizontal direction from a position slightly below the lower end of the three-dimensional object, and a portion where a contrast change is irregular is estimated as the covering of the pedestrian crossing with the three-dimensional object.

In addition, in Examples 1 and 2, the to-be-covered object is the pedestrian crossing. However, in the stereoscopic camera apparatus according to the present invention, the same process can be realized using a traffic sign having a known shape other than a pedestrian crossing, for example, using characters such as "STOP". In this case, using affine transformation, a sign image on a road is transformed into an image of the road when seen from above. This transformed image is compared to an image of "STOP" which has been previously learned, and the sign "STOP" is identified. In addition, a portion having a large difference is extracted, and when the three-dimensional object is present in the portion, the covering with the three-dimensional object can be detected. Therefore, as in Examples 1 and 2, the determination and selection of the control target can be promoted. Further, in Examples 1 and 2, the three-dimensional object is the pedestrian. However, the process can be performed by using another vehicle as the three-dimensional object.

Further, in the stereoscopic camera apparatus according to the present invention, even when a road structure having a high linearity and a high probability of being the same color such as a pavement line, a curbstone, or a guardrail is set as the to-be-covered object, the same process can be performed. In this case, a white line will be described as an example. A white line candidate point, which is a portion where the contrast is changed in order from dark→bright-→dark from a lower end of the image, is calculated as a lower half of the image. By connecting the white line candidate points as left and right white lines, the white line can be detected. When the detection result is significantly shorter than a distance capable of detecting the white line, and when a three-dimensional object is detected in a portion where the detection cannot be performed, a process of promoting the same detection as that of Examples 1 and 2 can be realized by estimating the covering with the three-dimensional object.

REFERENCE SIGNS LIST

100: STEREOSCOPIC CAMERA APPARATUS ACCORDING TO EXAMPLE 1
101, 102: CAMERA
103, 104: IMAGE ACQUIRING UNIT
105: DISTANCE CALCULATING UNIT
106: THREE-DIMENSIONAL OBJECT EXTRACTING UNIT
107: THREE-DIMENSIONAL OBJECT TRACKING UNIT
108: PEDESTRIAN CROSSING DETECTING UNIT
109: CONTROL TARGET DETERMINING UNIT
110: CONTROL TARGET SELECTING UNIT
111: VEHICLE CONTROL DEVICE
201, 202, 203: IMAGE
302, 303: LENS
304, 305: IMAGING PLANE
501, 502: PEDESTRIAN CROSSING DETECTION FRAME
601: DIVIDED STRIPS
602: LUMINANCE PROJECTION GRAPH
603: LUMINANCE DISTRIBUTION GRAPH
701: SIMPLE RELIABILITY VERIFYING PROCESS
702: NORMAL RELIABILITY VERIFYING PROCESS
800: STEREOSCOPIC CAMERA APPARATUS ACCORDING TO EXAMPLE 2
801, 802: CAMERA
803, 804: IMAGE ACQUIRING UNIT
805: DISTANCE CALCULATING UNIT
806: THREE-DIMENSIONAL OBJECT EXTRACTING UNIT
807: THREE-DIMENSIONAL OBJECT TRACKING UNIT
808: PEDESTRIAN CROSSING DETECTING UNIT
809: CONTROL TARGET DETERMINING UNIT
810: CONTROL TARGET SELECTING UNIT
811: VEHICLE CONTROL DEVICE
901: LEFT PEDESTRIAN CROSSING DETECTION FRAME
902: RIGHT PEDESTRIAN CROSSING DETECTION FRAME
1001: SIMPLE RELIABILITY VERIFYING PROCESS
1002: NORMAL RELIABILITY VERIFYING PROCESS

The invention claimed is:

1. A stereoscopic camera apparatus comprising:
three-dimensional object detecting means for calculating at least a distance to a three-dimensional object in a real space, a horizontal position, and a width by stereoscopy based on images captured from first and second image sensors;
to-be-covered object detecting means for detecting a to-be-covered object having a known shape based an image captured from one of the first and second image sensors; and
to-be-covered object covering-detecting means for detecting whether or not the three-dimensional object detected by the three-dimensional object detecting means covers the to-be-covered object when the to-be-covered object is detected by the to-be-covered object detecting means,
wherein when it is detected that the three-dimensional object covers the to-be-covered object, the to-be-covered object covering-detecting means detects the three-dimensional object which covers the to-be-covered object by performing a process for determining whether or not the three-dimensional object is present in fewer operations than a process for determining whether or not the three-dimensional object is present when it is detected that the three-dimensional object does not cover the to-be-covered object.

2. The stereoscopic camera apparatus according to claim 1,
wherein a process using the three-dimensional object detecting means is performed before a process using the to-be-covered object detecting means.

3. The stereoscopic camera apparatus according to claim 2,
wherein the three-dimensional object detecting means includes
distance calculating means for calculating a depth map by stereoscopy based on the images captured from the first and second image sensors, three-dimensional object extracting means for obtaining an extracted three-dimensional object having a position, a distance, and a width as parameters based on the depth map obtained by the distance calculating means, and three-dimensional object tracking means for obtaining a tracked three-dimensional object having a position, a distance, a width, and a relative speed, which are filtered in a chronological order, as parameters based on the extracted three-dimensional object obtained by the three-dimensional object extracting means, and the to-be-covered object covering-detecting means sets pedestrian crossing detection frames for determining whether or not the pedestrian crossing is present on left and right sides of position information of the tracked three-dimensional object obtained by the three-dimensional object tracking means.

4. The stereoscopic camera apparatus according to claim 1, wherein a process using the to-be-covered object detecting means is performed before a process using the three-dimensional object detecting means.

5. The stereoscopic camera apparatus according to claim 4, wherein the to-be-covered object detecting means sets pedestrian crossing detection frames for determining whether or not a pedestrian crossing is present at left and right ends of an image captured from one of the first and second image sensors.

6. The stereoscopic camera apparatus according to claim 4, wherein the three-dimensional object detecting means includes distance calculating means for calculating a depth map by stereoscopy based on the images captured from the first and second image sensors, three-dimensional object extracting means for obtaining an extracted three-dimensional object having a position, a distance, and a width as parameters based on the depth map obtained by the distance calculating means, and three-dimensional object tracking means for obtaining a tracked three-dimensional object having a position, a distance, a width, and a relative speed, which are filtered in a chronological order, as parameters based on the extracted three-dimensional object obtained by the three-dimensional object extracting means, and the three-dimensional object extracting means extracts the extracted three-dimensional object based on the depth map obtained by the distance calculating means and the to-be-covered object having a known shape obtained by the to-be-covered object detecting means.

7. The stereoscopic camera apparatus according to claim 3, wherein when it is detected that the tracked three-dimensional object does not cover the to-be-covered object, the to-be-covered object covering-detecting means verifies whether or not the extracted three-dimensional object matches the same tracked three-dimensional object through a preset number or more of plural frames such that only the tracked three-dimensional object satisfying a condition is registered as a control candidate three-dimensional object, and when it is detected that the tracked three-dimensional object covers the to-be-covered object, the to-be-covered object covering-detecting means verifies whether or not the extracted three-dimensional object matches the same tracked three-dimensional object through a smaller number of plural frames than the preset number of the plural frames such that only the tracked three-dimensional object satisfying a condition is registered as a control candidate three-dimensional object, or the tracked three-dimensional object is registered as a control candidate three-dimensional object without verification.

8. The stereoscopic camera apparatus according to claim 1, wherein the to-be-covered object is one or plural three-dimensional objects among a traffic sign painted on a road, a pavement line including a white line painted on a road, a pedestrian crossing painted on a road, and a linear road structure including a curbstone installed along a road.

* * * * *